United States Patent
Lim

(10) Patent No.: US 7,602,967 B2
(45) Date of Patent: *Oct. 13, 2009

(54) METHOD OF IMPROVING IMAGE QUALITY

(75) Inventor: Sung-hyun Lim, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 908 days.

This patent is subject to a terminal disclaimer.

(21) Appl. No.: 10/877,820

(22) Filed: Jun. 28, 2004

(65) Prior Publication Data

US 2005/0013502 A1    Jan. 20, 2005

(30) Foreign Application Priority Data

Jun. 28, 2003    (KR)  .................... 10-2003-0042937

(51) Int. Cl.
    *G06K 9/00*    (2006.01)
(52) U.S. Cl. .................. 382/162; 382/167; 382/254
(58) Field of Classification Search ......... 382/162–165, 382/167, 176, 302, 254
    See application file for complete search history.

(56) References Cited

U.S. PATENT DOCUMENTS

| | | | |
|---|---|---|---|
| 4,996,603 A | 2/1991 | Kanemitsu et al. | |
| 5,073,953 A | 12/1991 | Westdijk | |
| 5,341,226 A | 8/1994 | Shiau | |
| 5,883,973 A | 3/1999 | Pascovici et al. | |
| 5,956,468 A | 9/1999 | Ancin | |
| 6,009,196 A | 12/1999 | Mahoney | |
| 6,125,205 A | 9/2000 | Rivoallon | |
| 6,137,907 A | 10/2000 | Clark et al. | |
| 6,227,725 B1 | 5/2001 | Ancin et al. | |
| 6,516,091 B1 | 2/2003 | Nagarajan et al. | |
| 6,557,759 B1 | 5/2003 | Zolotarev et al. | |
| 6,721,000 B1 | 4/2004 | Lin et al. | |

(Continued)

FOREIGN PATENT DOCUMENTS

| | | |
|---|---|---|
| EP | 0358815 | 3/1990 |
| JP | 11-134434 | 5/1999 |
| JP | 11-220631 | 8/1999 |
| JP | 2002-051222 | 2/2002 |
| KR | 1995-1551 | 1/1995 |
| KR | 242298 B1 | 11/1999 |

OTHER PUBLICATIONS

U.S. Appl. No. 10/370,110, filed Feb. 21, 2003, Sung-hyun Lim, Samsung Electronics Co., Ltd.
European Search Report dated Apr. 17, 2007, issued in corresponding European Patent Application No. 03250196.7.

*Primary Examiner*—Duy M Dang
(74) *Attorney, Agent, or Firm*—Staas & Halsey LLP

(57) ABSTRACT

A method of improving image quality of a reproduced image, the method including converting red, green, and blue color data of a subject pixel into color data having brightness and chroma components; identifying the subject pixel as a background pixes, a picture pixel, or a text pixel according to the brightness and the chroma components; storing history information of the subject pixel, wherein the history information includes the number of continued background pixels or continued picture pixels before the subject pixel; detecting features of the subject pixel according to the history information; labeling the subject pixel to be included in one of a text area, a background area, and a picture area according to a state of a previously labeled adjacent pixel and the detected features of the subject pixel; and processing the subject pixel according to the area to which the subject pixel belongs.

30 Claims, 6 Drawing Sheets

U.S. PATENT DOCUMENTS

| | | |
|---|---|---|
| 6,807,298 B1 | 10/2004 | Park et al. |
| 6,813,367 B1 | 11/2004 | Bhattacharjya |
| 6,826,309 B2 | 11/2004 | Sindhu |
| 6,839,151 B1 | 1/2005 | Andree et al. |
| 6,993,185 B2 | 1/2006 | Guo et al. |
| 2002/0033969 A1 | 3/2002 | Nakanishi et al. |
| 2005/0013502 A1 | 1/2005 | Lim |

METHOD OF IMPROVING IMAGE QUALITY

CROSS-REFERENCE TO RELATED APPLICATIONS

This application claims the benefit of Korean Patent Application No. 2003-42937, filed on Jun. 28, 2003, in the Korean Intellectual Property Office, the disclosure of which is incorporated herein by reference.

BACKGROUND OF THE INVENTION

1. Field of the Invention

The present invention relates to a method of improving an image quality, and, more particularly, to a method of improving an image quality by differentiating text from pictures and using the differentiated result when a document, on which text and pictures are mixed, is scanned and input from an image input apparatus.

2. Description of the Related Art

U.S. Pat. No. 4,996,603 discloses an image processing system. An input subject pixel is determined to be a text pixel or a picture pixel, and the text pixel is processed as a fixed slice, and the picture pixel is processed as a halftone. Here, the halftone process is used to print black-and-white photographs on newspapers or on magazines, and outputs in two values, that is, in two levels of black and white to display a gray scale. The halftone processing is suitable for processing images in a case in which actual gray output of a high image quality cannot be made, but the two-level output is required. However, the halftone processing lowers the resolution since the image is blocked into predetermined decomposition areas.

The above cited reference discloses three detection circuits to find the text. The detection circuits are a successive gray color detection circuit, a fine line detection circuit, and a black color detection circuit. The successive gray color detection circuit inspects repetition in a predetermined period by setting the highest brightness limit, the fine line detection circuit calculates a difference between adjacent pixels, and the black color detection circuit inspects the repetition of brightness under the lowest brightness limit.

However, in a case in which a screened halftone pattern is shown on the image, the high brightness pixel is represented intermittently, thus incorrectly causing the picture to be recognized as text. Here, the screened halftone refers to a distortion shown in data formed by scanning a halftone image output after a picture area is halftone processed. When the screened halftone pattern is shown on the image, the pixel having a higher brightness, that is, having a brightness higher than a predetermined limit, is shown intermittently, and the probability of incorrect recognition of the picture as text increases. Therefore, when a halftone processed document is scanned, the halftone processed picture may be recognized as text. When the incorrectly recognized text is processed, a highly distorted output can be shown when the image is reproduced.

U.S. Pat. No. 6,227,725 discloses a method for improving text process for a color and gray scale document. This method calculates the brightness, chromaticity, and gradient of the subject pixel, differentiates the subject pixel roughly as a text pixel, picture pixel, or a background pixel, and suppresses the background pixel while widening the area determined to contain the text pixel using connect components.

However, according to the above cited reference, since the pixels located on an edge of the text and an adjacent area only are determined to be text, an inner part of the text of medium or larger size is determined to be a picture. Also, the image is processed in a pixel unit, and after that, the area determined to contain the text is expanded using the connect components. However, the texts and pictures cannot be differentiated by a desired area unit. That is, since the picture and text pixels are mixed on the image, the image quality of the output document is lowered unless the differentiation is made in an area unit.

SUMMARY OF THE INVENTION

The present invention provides a method of improving image quality by differentiating an image on which texts and pictures are mixed into a picture area and a non-picture area including texts and background, and processing the differentiated areas differently.

Additional aspects and/or advantages of the invention will be set forth in part in the description which follows and, in part, will be obvious from the description, or may be learned by practice of the invention.

According to an aspect of the present invention, there is provided a method of improving image quality of a reproduced image, the method including converting red, green, and blue color data of a subject pixel into color data having brightness and chroma components; identifying the subject pixel as a background pixes, a picture pixel, or a text pixel according to the brightness and the chroma components; storing history information of the subject pixel, wherein the history information includes the number of continued background pixels or continued picture pixels before the subject pixel; detecting features of the subject pixel according to the history information; labeling the subject pixel to be included in one of a text area, a background area, and a picture area according to a state of a previously labeled adjacent pixel and the detected features of the subject pixel; and processing the subject pixel according to the area to which the subject pixel belongs.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
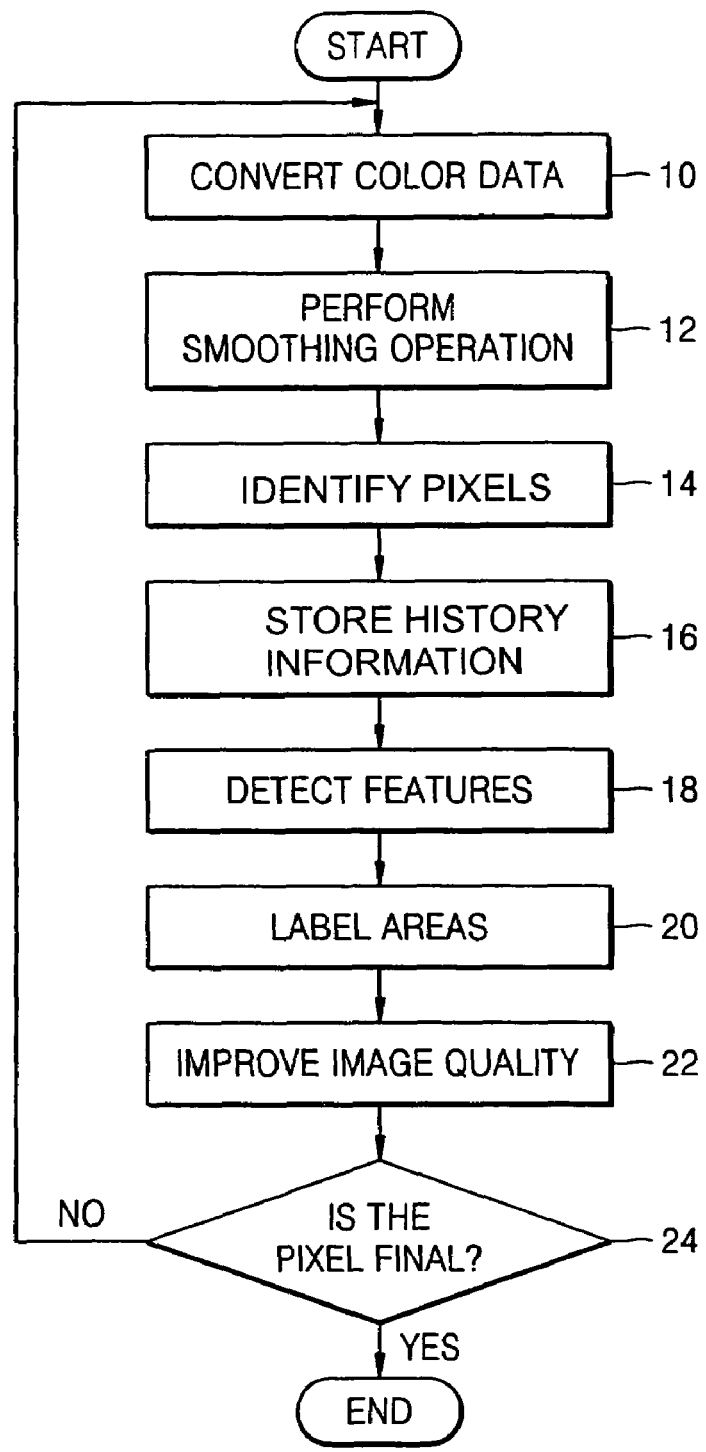
FIG. 1 is a flow chart of a method of improving an image quality according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Image data having pixels having predetermined resolutions, taken from an image medium which is scanned through an image input apparatus such as a scanner, is to be processed according to the method of the present invention.

The scanner performs the scanning operation through an image sensor by reflecting light on an image medium, such as a document on which background, text, and pictures are mixed, and receiving the reflected light after converging it. The image sensor can be a charge coupled device (CCD), or a contact image sensor (CIS), etc. The image sensor includes a plurality of electric cells, and receives the light reflected from the document corresponding to analog image data and converts the light into digital image data having a predetermined resolution. The minimum unit of the converted data corresponding to respective cells is referred to as a pixel.

In the present invention, a 'subject pixel' refers to a pixel to which the method of improving image quality according to the present invention is applied. 'A subject line' means a row including the subject pixel. Also, a left direction pixel refers to a pixel processed before processing the subject pixel in the subject line. A right direction pixel refers to a pixel to be processed after processing the subject pixel in the subject line. An upper direction pixel refers to a pixel adjacent to the subject pixel in a line processed immediately before processing the subject line. A lower direction pixel refers to a pixel adjacent to the subject pixel in a line to be processed immediately after processing the subject line.

The present invention improves the image quality of image data, which is obtained by scanning a document on which background, text, and pictures are mixed. The image data includes pixels having a predetermined resolution. A subject pixel is determined to be disposed in one of a text area, a background area, and a picture area, and the area including the subject pixel is processed differently according to the type of the area. Then, an adjacent next pixel is set to be a subject pixel and the image quality improving process proceeds sequentially.

FIG. 1 is a flow chart of the method of improving image quality according to an embodiment of the present invention. The method of improving the image quality includes a color data converting operation 10, a smoothing operation 12, a pixel identification operation 14, a history information storing and updating operation 16, a feature detecting operation 18, an area designating operation 20, an image quality improving operation 22, and a final pixel determining operation 24.

In more detail, the color data converting operation 10 converts RGB color data of the subject pixel into color data having brightness components and chroma components.

A model for displaying colors is represented as a three-dimensional coordinate system, and is mostly used in a color monitor, a color printer, animation graphics, or a television image. There are color models such as an RGB model for the color monitor or a color video camera, a YIQ model which is the standard of color television broadcasting, and a YCbCr model.

The RGB color model originates from a method of operating an image sensor and a light emitting device for displaying in a camera or a scanner. In order to process a color image of 256 gray scales, since 8 bits are allocated to R, G, and B colors respectively per one pixel, a storing space of 24 bits, that is, 3 bytes, is required per pixel unit.

The YIQ color model divides RGB color data into brightness components and chroma components. The Y component, representing the brightness, provides all video information required by a black-and-white television, and the I component and the Q component respectively represent an inphase and a quadrature color component. Equation 1 is used to convert color data from the RGB color model to the YIQ color model.

$$Y = 0.29900R + 0.58700G + 0.11400B$$
$$I = 0.59600R - 0.27500G - 0.32100B$$
$$Q = 0.21200R - 0.52300G + 0.31100B$$

Equation 1

The YCbCr color model is suggested by International Telecommunication Union, Radio Communication Sector (ITU-R) BT.601 to establish digital video components. YCbCr is another color space for dividing the brightness from the color information. The brightness is symbolized as Y, and blue information and red information are symbolized as Cb and Cr. There are many ways to convert the YCbCr color model and the RGB color model into each other. A typical color data converting equation suggested by ITU-R, and used in image compression such as Joint Photographic Expert Group (JPEG) and Motion Picture Experts Group (MPEG), is shown in Equation 2.

$$Y = 0.29900R + 0.58700G + 0.11400B$$
$$Cb = -0.16874R - 0.33126G + 0.50000B$$
$$Cr = 0.50000R - 0.41869G - 0.08131B$$
$$R = 1.00000Y + 1.40200Cr$$
$$G = 1.00000Y - 0.34414Cb - 0.71414Cr$$
$$B = 1.00000Y + 1.77200Cb$$

Equation 2

In a case in which the color data is converted using the YCbCr color model, the brightness component is adopted as the Y component, and the chroma component can be calculated using Cb and Cr components. For example, the chroma component can be calculated by adding the absolute value of Cb and the absolue value of Cr. Also, the color saturation component may be a root mean square (RMS) value of the Cb and Cr, for example.

When the color conversion is completed in operation 10, the data smoothing operation 12 may be selectively further added. The smoothing operation smoothes high frequency components in the brightness component using a low pass filter. Here, the filter means a spatial filter, and can be referred to as a mask, generally. The low pass filter converts a screened halftone area similarly to a continued tone image. The screened halftone area is generated by scanning a halftone processed image. The screened halftone area may incur an error in the case of separating a picture area from other areas in the scanned image, and then incur distortion by emphasizing the incorrectly separated picture area.

The smoothing operation by the low pass filter is an image processing method used in a pre-processing operation to remove fine parts in the image, connect small gaps in curves and lines, or remove noise before a large object is extracted.

A size of the low pass filter performing the smoothing process is appropriately determined according to a resolution and an output specification of the image sensor in the scanner. This is because as a size of a mask block becomes larger, the distortion in the output due to the screened halftone area can be reduced. Also, the sharpness of the image is lowered by suppressing the high frequency component excessively.

Figure 2:
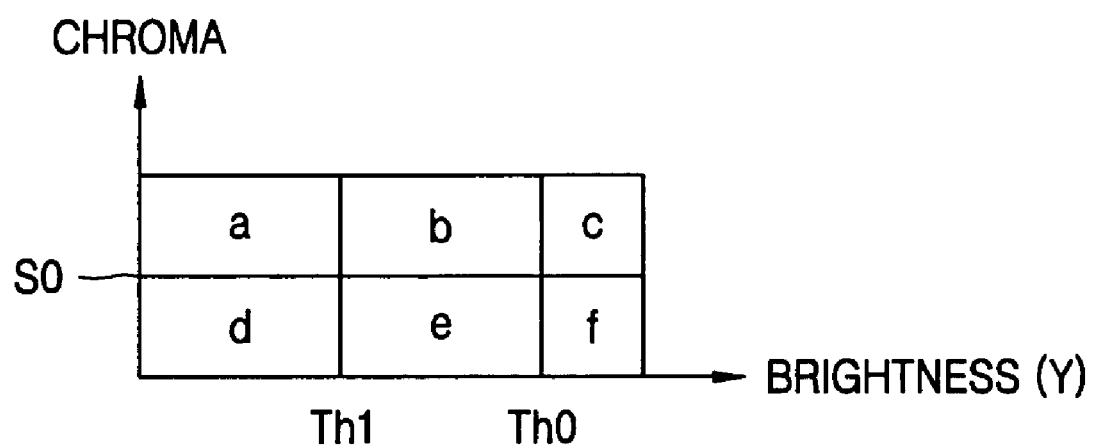
FIG. 2 illustrates an example of identifying a subject pixel using the highest brightness limit and the lowest brightness limit.

The smoothed image is identified with respect to the respective pixels (operation 14). The subject pixel is identified as a background pixel, a picture pixel, or a text pixel using the brightness component and the chroma component of the subject pixel. That is, the subject pixel is identified as a background pixel, a picture pixel, or a text pixel using a predetermined brightness limit and chroma limit. Preferably, though not necessarily, the subject pixel is identified as a background pixel, a picture pixel, or a text pixel using the highest brightness limit th0 and the lowest brightness limit th1. FIG. 2 illustrates an example of identifying a subject pixel using the highest brightness limit th0 and the lowest brightness limit th1. Referring to FIG. 2, when the brightness component of the subject pixel is higher than the highest brightness limit th0, and the chroma component of the subject pixel is lower than the chroma limit S0, the subject pixel is identified as a background pixel. In FIG. 2, a reference f indicates a background pixel. Also, in a case in which a subject pixel is not identified as a background pixel, when the brightness component of the subject pixel is higher than the lowest brightness limit th1, or the chroma component of the subject pixel is higher than the chroma limit S0, the subject pixel is identified as a picture pixel. That is, when the brightness component of the subject pixel is lower than th0 and higher than th1, or when the chroma component is higher than S0, the subject pixel is identified as a picture pixel. In FIG. 2, references of a, b, c, and e are the picture pixels. In a case in which the subject pixel is identified as neither a background pixel nor a picture pixel, the subject pixel is identified as a text pixel. In FIG. 2, a reference of d indicates a text pixel.

The history information storing operation 16 stores the number of continuous pixels of the same type, which is used to detect background features and the picture features in the feature detecting operation 18, as background history information or as picture history information. In this operation, the number of the continuous background pixels, picture pixels, and non-background pixels in the upper direction or the left direction of the subject pixel are updated and stored respectively, using the previously stored history information of the background pixels or the picture pixels and the pixel identification result of the present subject pixel.

As an example of storing the background history information, when the subject pixel is identified as a background pixel in operation 14, the number of the upwardy and leftwardly continuous background pixels, including the subject pixel, is stored as the background history information of the subject pixel. Preferably, though not necessarily, when the number of the upwardly continuous background pixels including the subject pixel is m or larger, and the number of the leftwardly continuous background pixels including the subject pixel is n or larger, a value of m×n is stored as the background history information of the subject pixel. In more detail, m and n can be set as 5 in 600 dpi resolution.

As an example of storing the picture history information, when the subject pixel is identified as a picture pixel, the number of the upwardly and leftwardly continuous picture pixels, including the subject pixel, is stored as the picture history information. Preferably, though not necessarily, when the number of the upwardly continuous picture pixels including the subject pixel is larger than p, and the number of the leftwardly continuous picture pixels including the subject pixel is larger than q, p×q is stored as the picture history information. In more detail, p may be set as 10 and q may be set as 20 in 600 dpi resolution.

As an another example of storing the picture history information, when the subject pixel is identified as a non-background pixel, the number of the leftwardly continuous non-background pixels, including the subject pixel, is stored as the picture history information of the subject pixel. Preferably, though not necessarily, when the number of the leftwardly continuous non-background pixels including the subject pixel is r or larger, r is stored as the picture history information of the subject pixel. In more detail, r may be set as 200 in 600 dpi resolution.

When the history information is updated and stored, the actual features of the subject pixel are detected (operation 18). Then the subject pixel is labeled to be designated as one of text area, background area, and picture area with reference to states of adjacent pixels which have been previously processed (operation 20). In an actual image, since the picture, the text, and the background are adjacent to each other, the area labeling results of adjacent pixels affect the subject pixel, and, especially, if there is no change such as an introduction of a new feature, the results affect the subject pixel much more.

Figure 3:
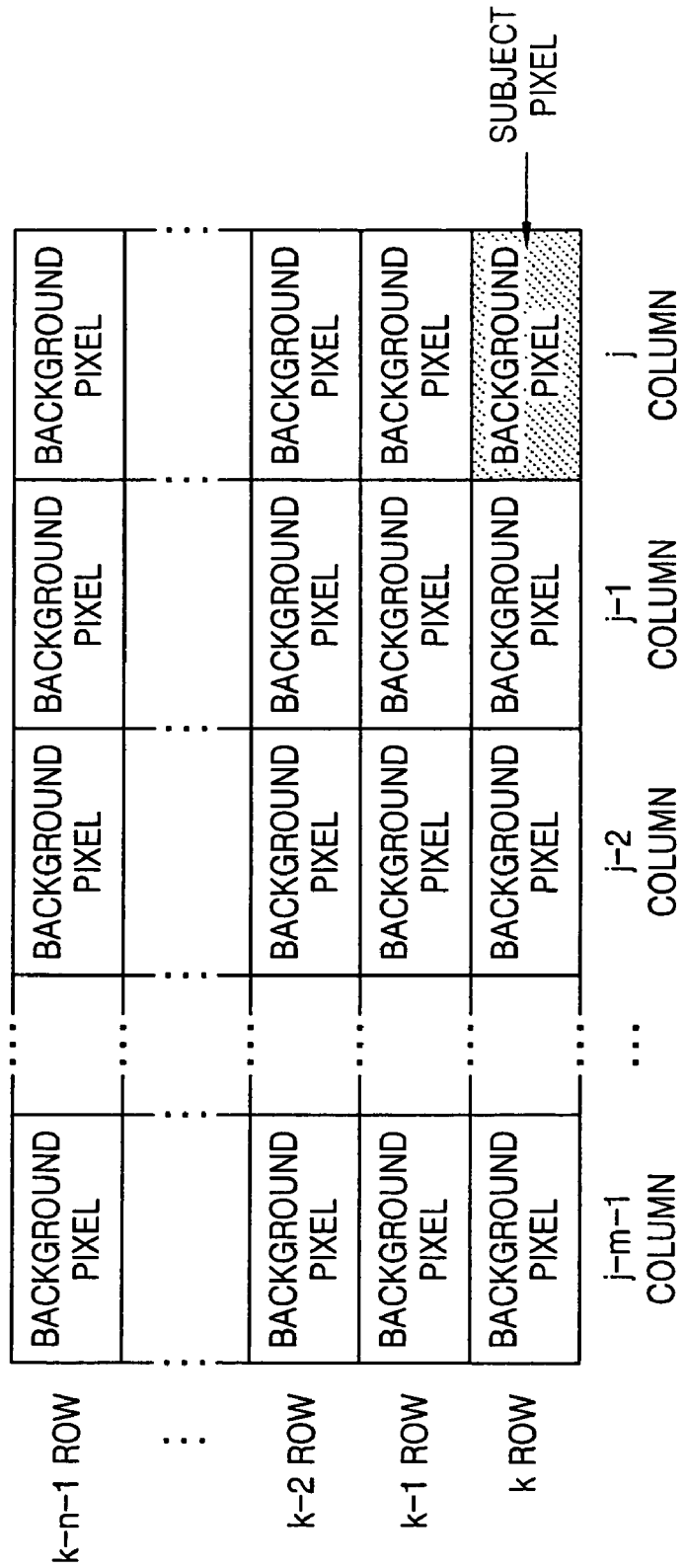
FIG. 3 illustrates a block structure used to detect a background feature.

Detecting the features of the subject pixel (operation 18) is performed through the following processes. If the subject pixel is identified as a background pixel in operation 14, the background features of the subject pixel are detected. One condition checked while detecting background features is whether or not the background pixels exist continuously in a pixel block having a size of m×n, for example m=n=5 with 600 dpi resolution. FIG. 3 is a view of a block structure for detecting the background features. If the subject pixel is located on k-th row, j-th column, the background features for the subject pixel are detected. When processing the subject pixel, there is no need to have gray or color information of the pixels included in the block m×n for searching the background features. However, the information of the number of background pixels continued upward and leftward from the subject pixel is required. Therefore, the memory used per each pixel requires $\log_2 m+1$ bits.

Figure 4:
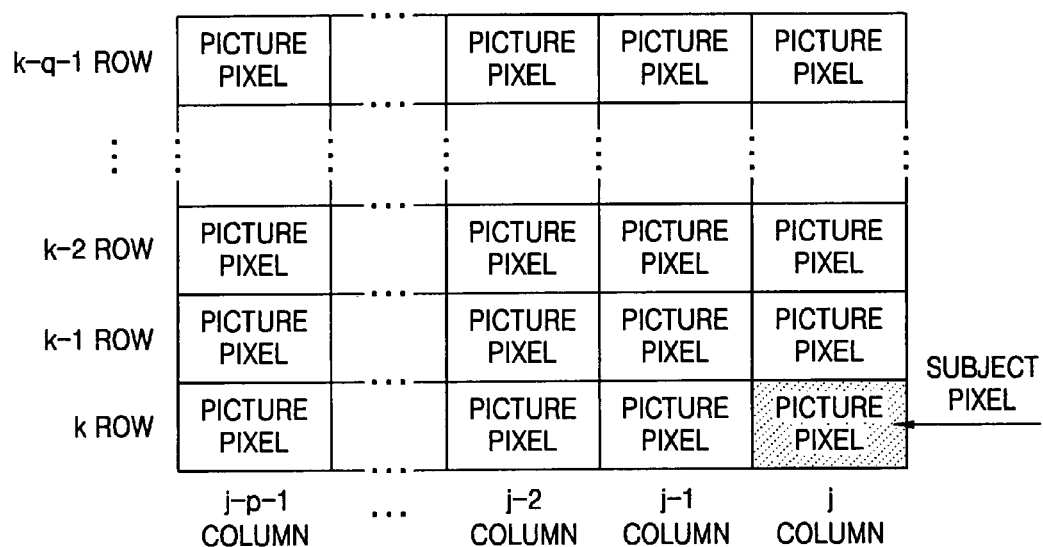
FIG. 4 illustrates a block structure used to detect a picture feature.

If the subject pixel is identified as a picture pixel, the picture features of the subject pixel are detected. In order to detect the picture pixels, a pixel block having a size of p×q shown in FIG. 4 is required. For example, if the resolution is 600 dpi, p is 10 and q is 20. The picture features can be detected when the pixels in the block are all picture pixels, or the pixels that are not background pixels are continued more than a non-background pixel limit (200 in the image of 600 dpi resolution) on the subject line. As in the background features, there is no need to require the gray or color information of the pixels included in the block of p×q. However, the information of the number of background pixels continued upward and leftward from the subject pixel is required. Therefore, the memory used per each pixel requires $\log_2 p+1$ bits.

Figure 5:
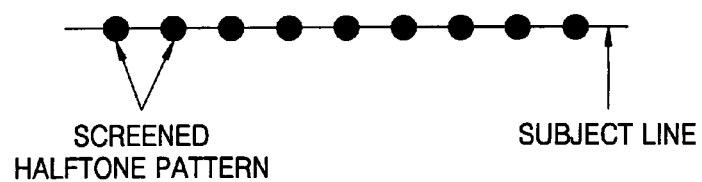
FIG. 5 illustrates a screened halftone pattern in which black and white are repeated in a subject line.

As another example of the picture feature detection, a structure shown in FIG. 5 can be provided. FIG. 5 is a view of a screened halftone pattern in which the black color and the white color are repeated on the subject line. In an image processed by the screened halftone pattern and printed, a circular shaped pattern appears periodically repeated as shown in FIG. 5. Viewed on the subject line, the pattern of black and white is repeated. When the pattern is output from the scanner, the image may be blurred due to optical characteristics of the lens. Consequently, relatively dark and bright patterns are repeated. Here, the number of the repeated pattern for pixels of a predetermined length is larger than one of the repeated pattern by a text sequence. In addition, since it is hardly shown on the background area, the pattern shown in FIG. 5 may represent the picture features. For example, if the brightness of pixels changes from dark to bright N times, for example, 10 times or more, during the processing of L pixels, for example, 100 pixels, in processing pixels toward the right direction on the subject line, the subject pixel is identified as a picture pixel since the above changes are generated only on the picture area. The identification result affects the feature detection of the pixel next to the subject pixel. That is, it is highly probable that the picture feature is detected in the next pixel.

Figure 6:
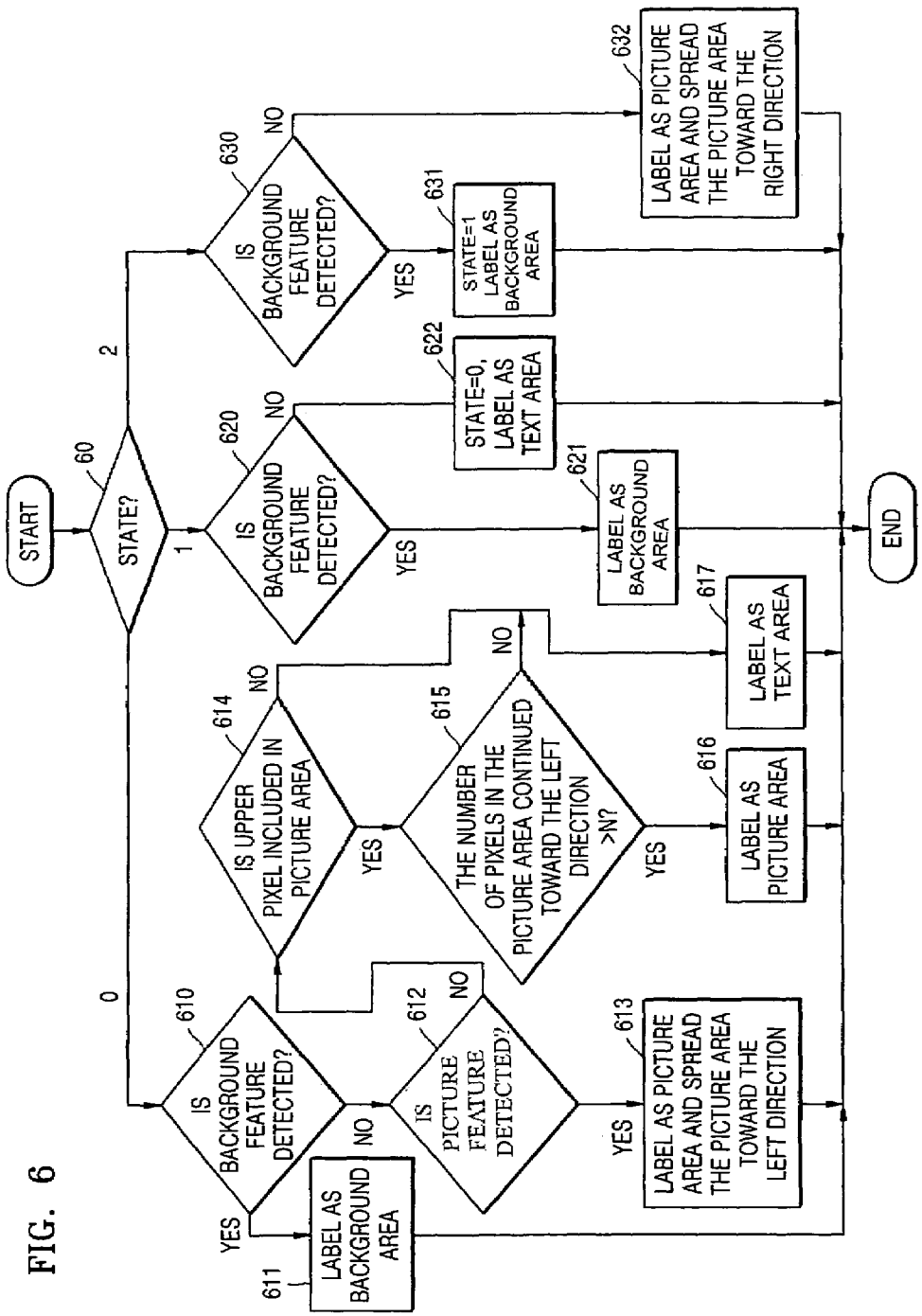
FIG. 6 is a flow chart illustrating a process of labeling an area with respect to the subject pixel of which the features are detected in FIG. 1.

FIG. 6 is a detailed flow chart illustrating a process of labeling an area with respect to the subject pixel of which the features are detected in FIG. 1.

A state of a previous pixel located on k-th row, j−1 column, that is, on the left side of the subject pixel located on k-th row, j-th column is determined. Here, the state is one of 0, 1, and 2, which indicates that the previous pixel is on the text area, the background area, or the picture area, respectively. Accordingly, the subject pixel can also be assumed to be included in the same area as that of the previous pixel. The state of the first pixel on the row is initialized to be included in the background area, that is, to be 1.

First, when the state value is 0 (operation 60), it is determined whether the background feature is detected with respect to the subject pixel or not (operation 611). If the background feature is detected, the subject pixel is labeled to be included in the background area (operation 611). If the background feature is not detected, it is determined whether the picture feature is detected or not (operation 612). If the picture feature is detected, the respective pixels on left side of the subject pixel are labeled as the picture area until the pixel of the background feature is met and the subject pixel is also labeled as the picture area (operation 613).

If the picture feature is not detected, it is determined whether the previous pixel on the upper side of the subject pixel, that is, the pixel on (k−1)th row, j-th column is labeled as the picture area (operation 614). If the upper previous pixel is labeled as the picture area, it is determined how many pixels are labeled consequently as the picture area among the pixels on the left side of the subject pixel. Then, if the number of pixels labeled as the picture area is larger than a predetermined limit N (operation 615), the subject pixel is labeled as the picture area (operation 616). That is, the picture area of the previous line of the subject line spreads toward a lower direction. If the number of pixels in operation 615 is smaller than N or the upper previous pixel is not in the picture area in operation 614, the subject pixel is labeled as the text area (operation 617).

When the state is 1 in operation 60, it is determined whether the background feature is detected with respect to the subject pixel or not (operation 620). If the background feature is detected, the subject pixel is labeled as the background area (operation 621). If the background feature is not detected, the state is set to be 0, and the subject pixel is labeled as the text area (operation 622). That is, in a case in which the subject pixel is not the background feature pixel, not the picture feature pixel, nor spread as the picture area, the subject pixel is labeled as the text area.

In operation 60, when the state is 2, it is determined whether the background feature is detected with respect to the subject pixel or not (operation 630). If the background feature is detected, the state is set to be 1 and the subject pixel is labeled as the background area (operation 631). If the background feature is not detected, the subject pixel is labeled as the picture area, and the picture area spreads toward the right direction. That is, all the pixels on the right side of the subject pixel are included in the picture area until the background feature pixel is met. The spread of picture area toward the right direction is made by classifying the pixels into the continuous tone or the halftone pattern using edge information and connectivity of the subject pixel.

When the subject pixel is labeled as part of a certain area, the image quality is improved using the brightness, chroma, and edge size of the pixel by determining the improvement degree according to the area to which the subject pixel belongs (operation 22).

In a case in which the subject pixel is labeled as the text area, the image quality is improved according to the brightness of the subject pixel. Preferably, though not necessarily, the brightness of the subject pixel is classified into three levels with reference to two predetermined brightness limit values. The pixel having the brightness level may be processed by a white filling process to set R=255, G=255, and B=255 in case of color 256-grayscale output. The pixel having the darkest level may be processed by a black filling process to set R=0, G=0, and B=0. The pixel of middle brightness may be processed by an unsharped masking process.

Following is a description of an example of the unsharped masking process.

The image processed by a high pass filter is calculated by a difference between the subject pixel (X) and the low-pass filtered image with respect to the subject pixel ($\overline{X}$) as shown in equation 3.

$$\text{highpass} = X - \overline{X} \qquad \text{Equation 3}$$

The unsharped masking process is a general process of subtracting a vague image from the original image, and increasing an emphasize coefficient multiplied by the subtracted result makes an edge emphasizing effect larger. An embodiment of the unsharped masked result can be calculated as following equation 4.

$$X' = X + k(X - \overline{X}) \qquad \text{Equation 4}$$

Here, X denotes the subject pixel, $\overline{X}$ denotes an average pixel, k denotes the emphasize coefficient, and X' is the unsharped masked result. That is, the unsharped masked result can be obtained by multiplying the high-pass filtered image by a predetermined emphasize coefficient and by adding the multiplied result to the original image of the subject pixel.

Figure 7A:
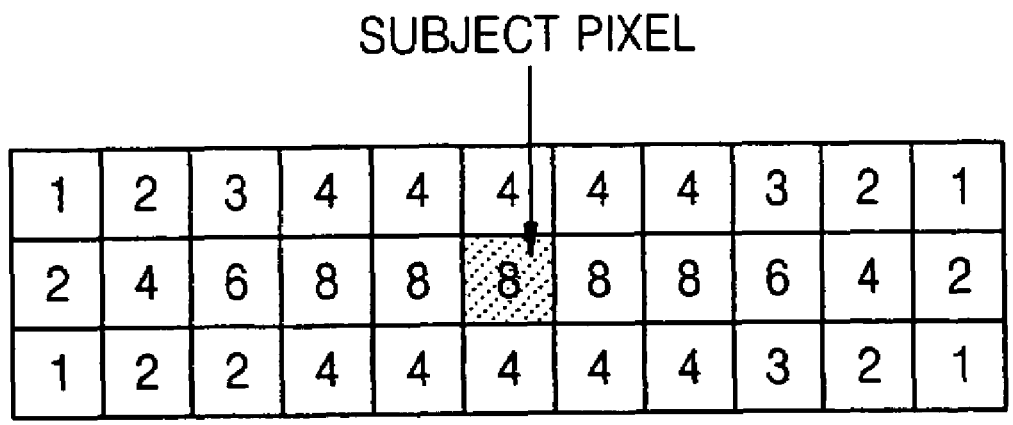
FIGS. 7A and 7B are examples of an unsharped mask filter.
Figure 7B:
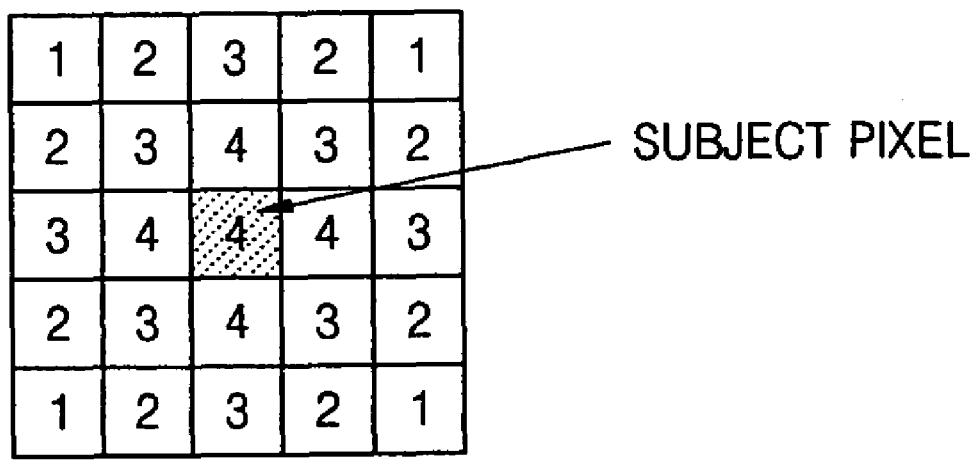

In a case in which the subject pixel is labeled as part of the picture area, the unsharped masking process is performed using an unsharped mask filter as shown in FIGS. 7A and 7B. The unsharped mask filter includes a mask window having a predetermined size with the subject pixel in the center, and mask values are formed as spatial pixel weights whereas the weight for a pixel is differentiated according to a distance from the subject pixel. If undesired high frequency noise such as the halftone image is included in the image in the unsharped masking process, a suppressed masking method may be used to prevent the image quality from being distorted.

The suppressed masking method can be calculated as in the following equation.

$$Y_{enh} = Y_{org} + k(Y_{org} - Y_{avg}) \qquad \text{Equation 5}$$

Here, $Y_{enh}$ denotes an emphasized result value for the corresponding pixel, $Y_{org}$ is an original mask value, and $Y_{avg}$ denotes an average of the mask values. The value 'k' is the emphasize coefficient.

Here, the mask size of $Y_{org}$ and the mask size of $Y_{avg}$ may be different from each other. In addition, it is desirable that the emphasize coefficient for the pixel of a halftone pattern is smaller than that for the pixel of a continuous tone pattern.

When the image quality is improved with respect to the subject pixel, it is determined whether the corresponding pixel is the final pixel or not (operation 24). If the corresponding pixel is determined not to be the final pixel, the process returns to operation 10 and performs the listed operations for the next pixel.

According to the present invention, the subject pixel is processed using the history information that represents how many pixels having the same features are continued. The subject pixel is identified as a pixel having a picture feature when the dark-and-bright pattern appears relatively frequently for a row of pixels of a predetermined length. It is, thus, more possible to accurately identify the pixels as ones of the text feature or the picture feature.

Also, in improving the image quality for the picture area, the unsharped mask filter having the spatial pixel weights is used to prevent the image quality from being distorted and to obtain an output of high quality. Also, a small amount of memory may be used to identify the areas by using the history information, thus reducing the cost.

The method of the present invention may be implemented by a system which may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or the ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of improving image quality of a reproduced image, the method comprising:
    converting red, green, and blue color data of a subject pixel into color data having brightness and chroma components;
    identifying the subject pixel as a background pixel, a picture pixel, or a text pixel according to the brightness and the chroma components;
    storing history information of the subject pixel, wherein the history information comprises the number of continued background pixels or continued picture pixels before the subject pixel;
    detecting features of the subject pixel according to the history information;
    labeling the subject pixel to be included in one of a text area, a background area, and a picture area according to a state of a previously labeled adjacent pixel and the detected features of the subject pixel; and
    using at least one processor device for processing the subject pixel according to the area to which the subject pixel belongs.

2. The method of claim 1, wherein predetermined brightness and chroma limits are used in the identifying the subject pixel as the background pixel, the picture pixel, or the text pixel.

3. The method of claim 2, wherein the predetermined brightness limits comprise a high brightness limit and a low brightness limit.

4. The method of claim 3, wherein the subject pixel is identified as the background pixel in response to the brightness component being larger than the highest brightness limit and the chroma component being smaller than the predetermined chroma limit.

5. The method of claim 4, wherein the subject pixel is identified as the picture pixel in response to the brightness component of the subject pixel being larger than the lowest brightness limit or the chroma component being larger than the chroma limit, and the subject pixel not being identified as the background pixel.

6. The method of claim 5, wherein the subject pixel is identified as the text pixel in response to being identified as neither the background pixel nor the picture pixel.

7. The method of claim 1, wherein the storing history information of the subject pixel comprises storing a number of continued background pixels in upper and left directions of the subject pixel as background history information in response to the subject pixel being identified as the background pixel.

8. The method of claim 7, wherein predetermined background limits are stored as the background history information in response to the number of continued background pixels in the upper and left directions exceeding the predetermined background limits.

9. The method of claim 1, wherein the storing history information of the subject pixel comprises storing a number of continued picture pixels in upper and left directions of the subject pixel as picture history information in response to the subject pixel being identified as the picture pixel.

10. The method of claim 9, wherein predetermined picture limits are stored as the picture history information in response to the number of continued picture pixels in the upper and left directions exceeding the predetermined picture limits.

11. The method of claim 1, wherein the storing history information of the subject pixel comprises storing a number of continued non-background pixels in a left direction of the subject pixel as picture history information in response to the subject pixel not being identified as the background pixel.

12. The method of claim 1, wherein the detecting features of the subject pixel comprises detecting background features in response to the subject pixel being identified as the background pixel and the history information indicating a higher number of continued background pixels in upper and left directions of the subject pixel than predetermined background limits.

13. The method of claim 1, wherein the detecting features of the subject pixel comprises detecting picture features in response to the subject pixel being identified as the picture pixel and the history information indicating a higher number of continued picture pixels in upper and left directions of the subject pixel than predetermined picture limits.

14. The method of claim 1, wherein the detecting features of the subject pixel comprises detecting picture features in response to dark and bright patterns being repeated more than a predetermined number of times for pixels having a predetermined length on a subject line.

15. The method of claim 1, wherein the labeling the subject pixel comprises:
    determining whether background features are detected from the subject pixel in response to an adjacent pixel left of the subject pixel being labeled as the text area; and
    labeling the subject pixel as the background area in response to the background features being detected.

16. The method of claim 15, further comprising:
   determining whether picture features are detected from the subject pixel in response to the background features not being detected;
   labeling pixels extending left of the subject pixel to be included in the picture area until a pixel having the background features is met, in response to the picture features being detected; and
   labeling the subject pixel to be included in the picture area.

17. The method of claim 16, wherein the labeling the subject pixel as the picture area comprises:
   determining whether an adjacent upper pixel of the subject pixel is included in the picture area in response to the picture feature not being detected;
   determining the number of pixels included in the picture area among the pixels extending left of the subject pixel, in response to the adjacent upper pixel being included in the picture area; and
   labeling the subject pixel to be included in the picture area in response to the determined number of pixels included in the picture area among the pixels extending left of the subject pixel being larger than a predetermined limit.

18. The method of claim 17, further comprising labeling the subject pixel to be included in the text area in response to the determined number of pixels included the picture area among the pixels extending left of the subject pixel being smaller than the predetermined limit.

19. The method of claim 17, wherein the determining the number of pixels included in the picture area among the pixels extending left of the subject pixel further comprises labeling the subject pixel to be included in the text area in response to the adjacent upper pixel not being included in the picture area.

20. The method of claim 1, wherein the labeling the subject pixel comprises:
   determining whether background features are detected from the subject pixel in response to an adjacent pixel left of the subject pixel being included in the background area; and
   labeling the subject pixel to be included in the background area in response to the background features being detected.

21. The method of claim 20, further comprising:
   setting the adjacent pixel left of the subject pixel to be included in the text area in response to the background features not being detected in in the subject pixel; and
   labeling the subject pixel to be included in the text area.

22. The method of claim 1, wherein the labeling the subject pixel comprises:
   determining whether background features are detected from the subject pixel in response to an adjacent pixel left of the subject pixel being included in the picture area;
   setting the adjacent pixel left of the subject pixel to be included in the background area in response to the background features being detected; and
   labeling the subject pixel to be included in the background area.

23. The method of claim 22, further comprising:
   labeling the subject pixel to be included in the picture area in response to the background features not being detected in the subject pixel; and
   spreading the picture area to the right of the subject pixel until a pixel having the background features is detected.

24. The method of claim 23, wherein the spreading the picture area is performed while classifying the subject pixel as a continuous tone or halftone pattern according to edge information and a connectivity of the subject pixel.

25. The method of claim 1, wherein the processing the subject pixel comprises:
   classifying the subject pixel as one of three brightness levels according to the brightness of the subject pixel in response to the subject pixel being labeled to be included in the text area; and
   white-filling the pixel of a brightest brightness level, black-filling the pixel of a darkest brightness level, or unsharped masking the pixel of a middle brightness level.

26. The method of claim 1, wherein the processing the subject pixel further comprises unsharped masking using an unsharped mask filter having a mask window of a predetermined size with the subject pixel at a center of the mask window, and having mask values of spatial pixel weights that differentiate weights for pixels according to distances from the subject pixel.

27. The method of claim 26, further comprising suppressed masking the pixels by following equation:

$Y_{enh}=Y_{org}+k(Y_{org}-Y_{avg})$, wherein $Y_{enh}$ denotes an emphasized result value for a corresponding pixel, $Y_{org}$ is an original mask value, $Y_{avg}$ denotes an average of the mask values, and k denotes an emphasize coefficient.

28. The method of claim 1, further comprising smoothing high frequency components in the brightness component using a low pass filter.

29. The method of claim 1, further comprising repeating the converting, identifying, storing, detecting, labeling and processing for all pixels forming the reproduced image.

30. The method of claim 29, wherein the smoothing high frequency components comprises removing fine parts in the image, connecting small gaps in curves or lines of the image, and/or removing noise before a large object is extracted from the image.

* * * * *

UNITED STATES PATENT AND TRADEMARK OFFICE
CERTIFICATE OF CORRECTION

| | | |
|---|---|---|
| PATENT NO. | : 7,602,967 B2 | Page 1 of 1 |
| APPLICATION NO. | : 10/877820 | |
| DATED | : October 13, 2009 | |
| INVENTOR(S) | : Lim | |

It is certified that error appears in the above-identified patent and that said Letters Patent is hereby corrected as shown below:

Title Page, Item (57) Column 2 (Abstract), Line 5, change "pixes" to --pixel--.

Column 11, Line 25, change "included the" to --included in the--.

Column 11, Line 45, change "in in the" to --in the--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,602,967 B2  Page 1 of 1
APPLICATION NO. : 10/877820
DATED : October 13, 2009
INVENTOR(S) : Sung-hyun Lim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1507 days.

Signed and Sealed this

Fifth Day of October, 2010

David J. Kappos
*Director of the United States Patent and Trademark Office*